US006701758B2

(12) United States Patent
Hoffmann

(10) Patent No.: US 6,701,758 B2
(45) Date of Patent: Mar. 9, 2004

(54) LOCKING APPARATUS FOR DOORS OF HOUSINGS OR CABINETS HAVING A NARROW FRAME PROFILE

(75) Inventor: Rainer Hoffmann, Langenfeld (DE)

(73) Assignee: EMKA Beschlagteile GmbH & Co. KG (DE)

( * ) Notice: Subject to any disclaimer, the term of this patent is extended or adjusted under 35 U.S.C. 154(b) by 0 days.

(21) Appl. No.: 09/979,645

(22) PCT Filed: Mar. 19, 2001

(86) PCT No.: PCT/DE01/01048

§ 371 (c)(1),
(2), (4) Date: Jan. 16, 2002

(87) PCT Pub. No.: WO01/71127

PCT Pub. Date: Sep. 27, 2001

(65) Prior Publication Data

US 2002/0157434 A1 Oct. 31, 2002

(30) Foreign Application Priority Data

Mar. 20, 2000 (DE) ........................................ 100 13 487

(51) Int. Cl.[7] ................................................ B60R 25/02
(52) U.S. Cl. ............................. 70/208; 70/462; 70/451; 292/336.3
(58) Field of Search .......................... 70/207, 208, 451, 70/462; 292/336.3, DIG. 31, 39, 142, 150, 172

(56) References Cited

U.S. PATENT DOCUMENTS

| | | | | |
|---|---|---|---|---|
| 4,631,937 A | | 12/1986 | Debus et al. | 70/207 |
| 5,102,174 A | * | 4/1992 | Prevot | 292/336.3 |
| 5,347,834 A | * | 9/1994 | Ramsauer | 70/120 |
| 5,419,167 A | * | 5/1995 | Yamada et al. | 70/462 X |
| 5,685,181 A | * | 11/1997 | Ramsauer | 70/208 |
| 5,722,269 A | * | 3/1998 | Simon et al. | 70/208 |
| 5,862,690 A | * | 1/1999 | Jancsek | 70/208 X |
| 5,873,274 A | * | 2/1999 | Sauerland | 70/208 |
| 5,893,282 A | * | 4/1999 | Runge et al. | 70/208 |
| 5,970,757 A | * | 10/1999 | Ramsauer | 70/208 |
| 6,039,363 A | * | 3/2000 | Sugimura et al. | 70/208 X |
| 6,138,484 A | * | 10/2000 | Sauerland et al. | 70/208 X |
| 6,174,007 B1 | * | 1/2001 | Schlack et al. | 70/208 X |
| 6,182,483 B1 | * | 2/2001 | von Kathen et al. | 70/208 |
| 6,363,761 B1 | * | 4/2002 | Sauerland | 70/208 |
| 6,454,322 B1 | * | 9/2002 | Su | 70/462 X |

FOREIGN PATENT DOCUMENTS

| | | |
|---|---|---|
| DE | 29913805 U1 | 12/1999 |
| EP | 0675994 B1 | 10/1995 |

* cited by examiner

*Primary Examiner*—Suzanne Dino Barrett
(74) *Attorney, Agent, or Firm*—R W Becker & Associates; R W Becker

(57) ABSTRACT

The invention relates to a lock for doors of housings or cabinets with particularly narrow frame profiles, comprising a bolt mechanism which is longitudinally moveably guided in the frame profile, and a door plate which can be fixed on the outside of the door leaf, said door plate having a first door plate area (11) with the handle (13) located therein and a second door plate area (12) in which the locking device is located.

9 Claims, 4 Drawing Sheets

LOCKING APPARATUS FOR DOORS OF HOUSINGS OR CABINETS HAVING A NARROW FRAME PROFILE

BACKGROUND OF INVENTION

Description

The invention relates to a locking apparatus for doors of housings or cabinets having in particular narrow frame profiles, with a bolt mechanism that is longitudinally guided in the frame profile of the cabinet or housing, and with a door plate that can be fixed to the exterior of the door leaf and in which a handle can be pulled out of the plane of the door plate and can be locked and unlocked in its inserted position in the door plate by means of a lock in the door plate, whereby arranged in the intermediate space located between the door leaf and the door plate are at least one pinion coupled to the handle and one transfer member that is driven by the pinion and that can, for longitudinally displacing it, be coupled to the bolt mechanism arranged in the frame profile of the cabinet or housing, and whereby the door plate has at least one member that is for receiving the lock and that extends through the door leaf in a through-hole arranged outside of the frame profile, and whereby the door plate has a first door plate area receiving the handle and a second door plate area.

EP 0 675 994 B1 describes a locking apparatus having the foregoing features that is suitable especially for cabinets and housings, the frame profiles of which have only a narrow cross-section for receiving a bolt mechanism housed therein. This bolt mechanism comprises at least one locking rod in rod guides guided in the frame profile, and engaging locking mounts located in the frame profile of the cabinet or housing. Since the frame profile does not have adequate room for receiving actuating parts affixed on the door and projecting over its interior side, which parts protrude all the way to the cabinet plane when the door is closed, in the known locking apparatus the door plate is formed with two door plate areas, whereby the handle, along with pinion, pivot pin bearing, and the locking apparatus for the handle are arranged in the second door plate area located laterally beside the frame profile of the cabinet or housing and here go through the door leaf toward the interior in provided through-holes, while the first door plate area, which does not have any special functioning parts, covers the transfer member arranged in the intermediate space between door leaf and door plate and its connection to the bolt mechanism located in the frame profile of the cabinet or housing.

The known locking apparatus is associated with the disadvantage that, due to the arrangement of handle and pinion in the second door plate area, a substantial distance to the bolt mechanism to be driven thereby must be bridged by means of the transfer member, so that, for instance, if the bolt mechanism tilts in the frame profile when the handle is actuated, a corresponding amount of torque must be applied, which increases the actuating forces to be applied and results in a high degree of stress to the cooperating teeth in the components so that the service life of the locking apparatus can be reduced.

The object of the present invention is therefore to prevent the aforesaid disadvantages in a locking apparatus with the generic features.

SUMMARY OF THE INVENTION

This object is achieved, including advantageous embodiments and further developments of the invention, using the contents of the patent claims that follow this specification.

The basic idea of the invention is that the first door plate area receiving the handle with the pinion borne on the interior-side of the door plate is arranged in front of the frame profile of the cabinet or housing with the bolt mechanism located therein, and, guided as a transfer member in the gap existing between pinion and the exterior wall of the first door plate area, is a toothed rod that is arranged parallel to the door leaf and that on its leading edge has teeth that engage in the pinion teeth and that has on its surface facing the frame profile a connecting element for the bolt mechanism arranged in the frame profile of the housing or cabinet, and in that the second door plate area located outside of the frame profile before the at least one through-hole of the door leaf has a mount for the lock for the handle that is arranged in the second door plate area, whereby the lock when actuated causes the release of the handle via a bolt plate that spans the first and second door plate areas and that is displaceable against the effect of a spring.

The present invention has the advantage that the handle provided for actuating the bolt mechanism located in the frame profile of the housing or cabinet is housed with the pinion and transfer member in the first door plate area that comes to rest before the frame profile when the door is closed without components that go through the door leaf being necessary, so that the actuating forces can be transferred from the handle on the short path directly to the bolt mechanism. If the lock for the handle protrudes over the door leaf plane towards the interior due to the necessary components, the lock is arranged in the second door plate area located outside the frame profile of the cabinet or housing when the door is closed so that it is only necessary to provide for a transfer of the closing or opening forces from the lock to the locking/unlocking for the handle, which inventively occurs by means of the bolt plate displaceably arranged on the interior side of the door plate.

In accordance with one exemplary embodiment of the present invention it is provided that the toothed rod is embodied in a rectangular shape with one leg actuated by the pinion and with one guide leg arranged at right angles thereto, and the guide leg has a cut-out for engaging a nose located on the bolt plate mounted on the door plate. This embodiment is associated with the advantage that the toothed rod does not require any particular mount, but rather is displaceably fixed via the nose engaging it that is a part of the bolt plate mounted on the door plate.

With regard to the embodiment and mounting of the pinion, in accordance with one exemplary embodiment of the present invention, it is provided that the pinion is embodied as a flat disk rotatably borne in a hat-shaped bearing ring of the door plate with pinion teeth that are axially raised on one side, whereby the diameter of the disk is greater than the diameter of the pinion teeth. This is associated with the advantage that the toothed rod provides the mount for the pinion in that the teeth embodied on the leading edge of the toothed rod engage in the pinion teeth raised axially on the disk and thereby is adjacent to the disk forming the pinion and thereby simultaneously holds the pinion against its bearing in the hat-shaped bearing ring.

If the pinion is fixed and borne on the door plate, in accordance with one exemplary embodiment of the present invention, the pinion itself is also used for the attachment or pivotable mounting of the handle in the door plate in that it is provided that the pinion has on its side opposing the pinion teeth a projection that extends into the depression of the door plate that receives the handle, on which projection are mounted a pivot pin of the handle engaging in the pinion in a form fit and the handle borne so as to be pivotable at right angles to the door plate plane. Since the handle is fixed on the pinion with the pivot pin, there is no need for attaching the pivot pin or the shaft extending through the pinion by means of a separate fastening nut, as is required in the prior art, which would also project into the interior of the cabinet or housing in an undesired manner.

In accordance with one exemplary embodiment of the present invention, if it is provided that the mounting of handle and pivot pin is detachable on the projection of the pinion when the handle is in a position pulled-out from the door plate, this results in the advantage that when the door plate is reconfigured to be right- or left-fixed, the handle and pivot pin can be removed from the exterior side of the door plate and can be re-installed once the door plate has been turned without it being necessary to access the actuating mechanism located in the interior of the door plate.

With respect to the options for selectably installing the door plate in a right-fixed or left-fixed door, or with respect to turning the door with the door plate already mounted, in accordance with one exemplary embodiment of the present invention it is provided that two pinions are borne in associated bearing rings in a symmetrical arrangement on the interior side of the door plate and the teeth of the toothed rod engage the two pinions. If the toothed rod engages the two pinions, when the toothed rod is actuated, one pinion is caused to rotate with no effect by the other pinion that is attached to the handle so that when the door plate or handle is reconfigured, the other pinion is used for the actuating pinion. Thus the door plate can be used as a unit in different installations without regard to the components built into its interior, whereby it is merely necessary to change the handle to a position rotated by 180°.

With regard to the desired selectable installation of the door plate for a right-fixed or left-fixed door, in accordance with one exemplary embodiment of the present invention it is provided that the lock, which is also to be used depending on the installation position, can be selectably employed in different positions in the door plate. In addition it can be provided that the second door plate area has at both its upper and lower edge areas an opening for selectably inserting the lock that extends through the associated through-hole in the door leaf and the other opening can be covered by a blind cap that is insertable in the door plate. For visual reasons, in accordance with one exemplary embodiment of the invention, it can be provided that the opening of the second door plate area receiving the lock can be covered by means of a sliding cap that can be displaced in the door plate transverse to the vertical axis of the door plate; using the sliding cap results in appropriately covering the blind cap used in the other opening on the opening receiving the lock, whereby the exterior view of the door plate is designed in an appropriate manner.

In accordance with one exemplary embodiment of the present invention, the blind cap and sliding cap can be convex relative to the door plate and can be exchangeably employed in a guide adjoining the opening of the door plate. Due to the convex design, the guide and bearing of the sliding cap and blind cap on the door plate are self-locking without having to worry about the caps falling out.

BRIEF DESCRIPTION OF THE DRAWINGS

The drawings illustrate one exemplary embodiment of the present invention that is described in the following. Shown is.

DESCRIPTION OF PREFERRED EMBODIMENTS

Figure 1:
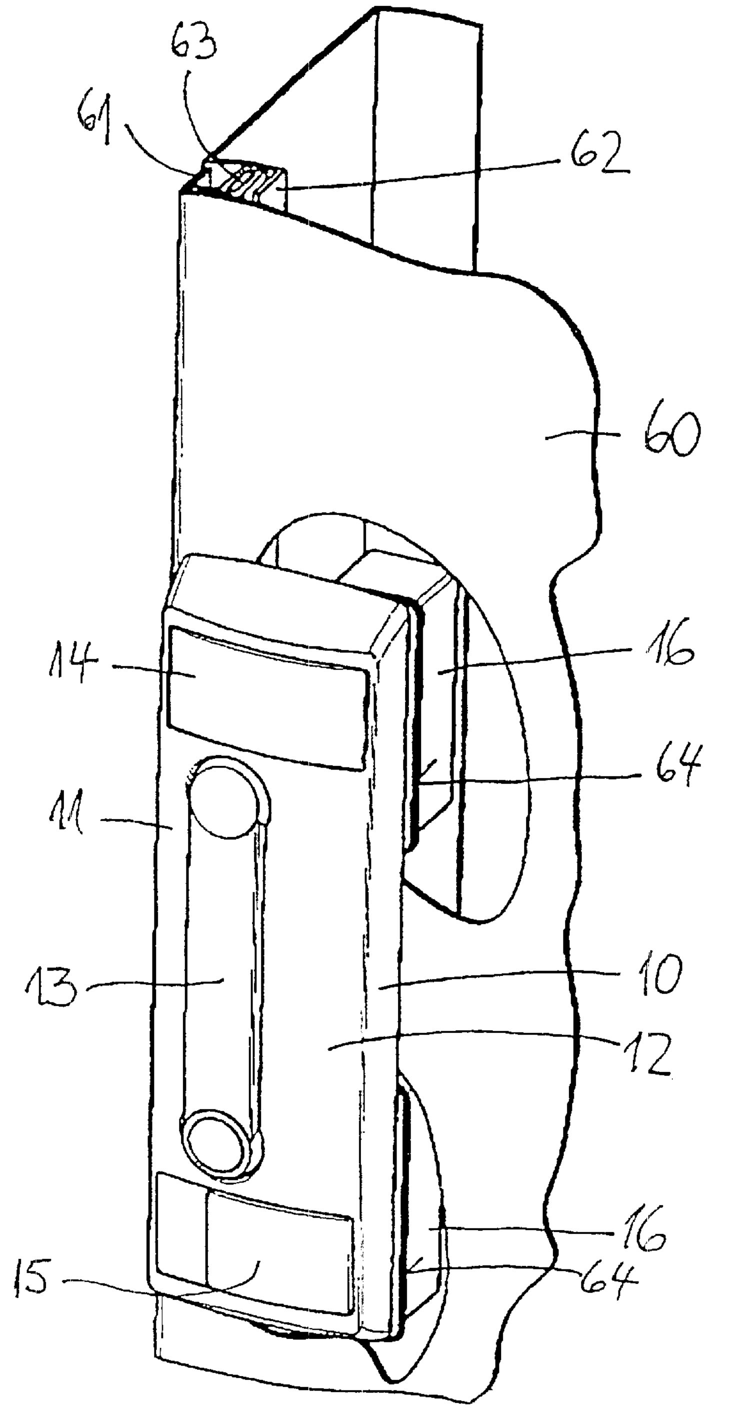
FIG. 1 a full view of a locking apparatus.

A door leaf 60 with a folded edge 61 of a cabinet or housing can be placed against a frame profile 62 in a closed cabinet or housing, whereby arranged in the frame profile is a bolt mechanism 63 as described in detail in the generic EP 0 675 994 B1 with the closing rod 12 and parts that cooperate therewith.

Affixed to the exterior side of the door leaf 60 for actuating the bolt mechanism 63 is a door plate 10 that has a first door plate area 11 with the handle 13 arranged therein and a second door plate area 12 in which is arranged a lock for the handle 13, which apparatus will be described in detail. While the first door plate area 11 with the handle 13 comes to rest before the frame profile 62 when the door is closed, the second door plate area 12 is outside of the frame profile 62 of the cabinet or housing so that parts that project inward into the cabinet or housing over the door leaf 60 for functional reasons, and that are provided with covering caps 16, pass through the door leaf through cut-outs 64 provided for this purpose. As can furthermore be seen from FIG. 1, provided at the upper end of the door plate 10 is an inserted blind cap 14 that can receive, for instance, a manufacturer emblem, while arranged at the lower end of the door plate 10 for covering the receiving opening provided there, in this case for a lock for the handle 13, is a sliding cap 15 that can be pushed to the left when the locking apparatus is in use so that it exposes the lock arranged therebehind, for instance in the form of a cylinder lock, which cylinder lock is covered on the back by the associated covering cap 16.

Figure 2:
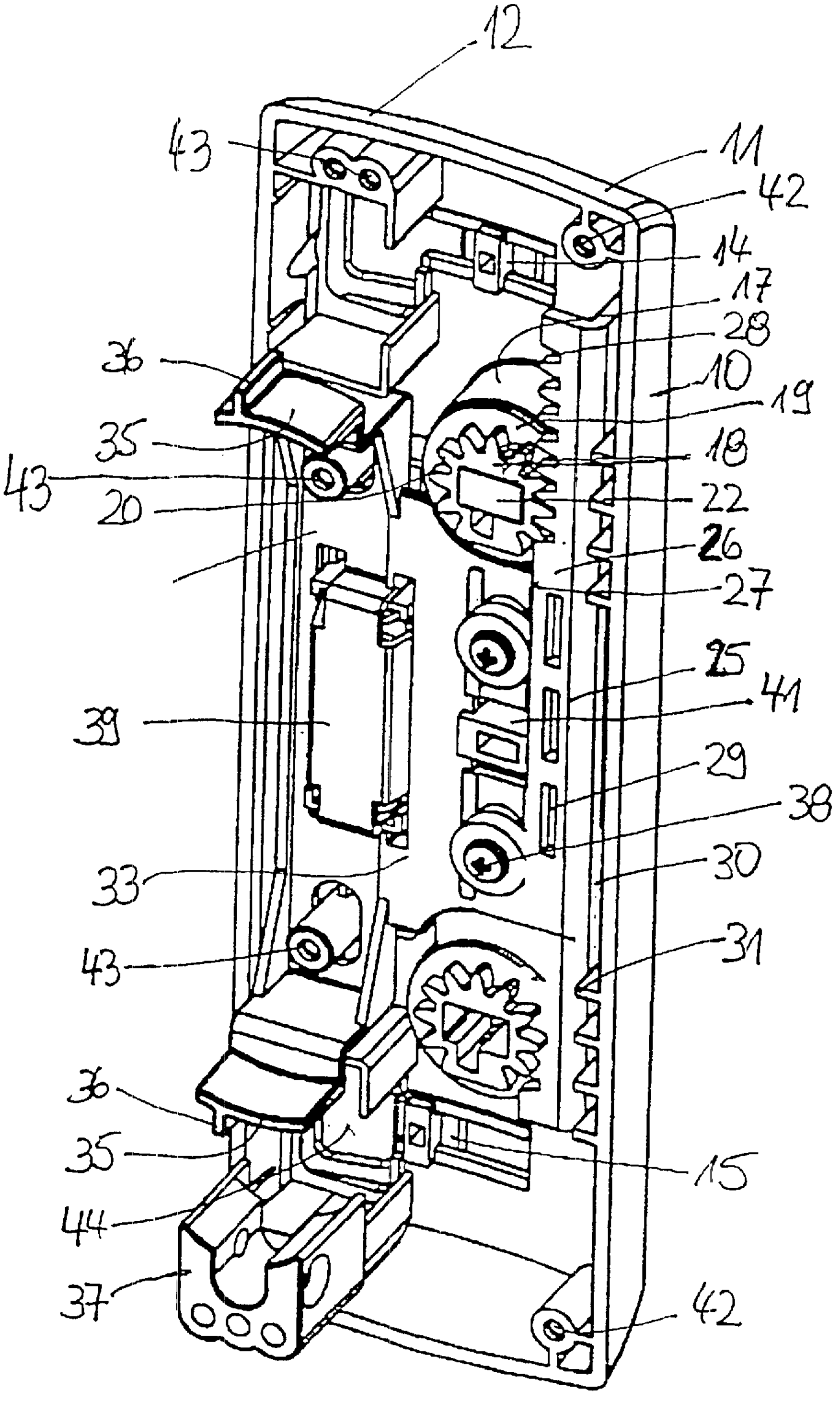
FIG. 2 a back view of the door plate of the locking apparatus with functional parts.
Figure 3:
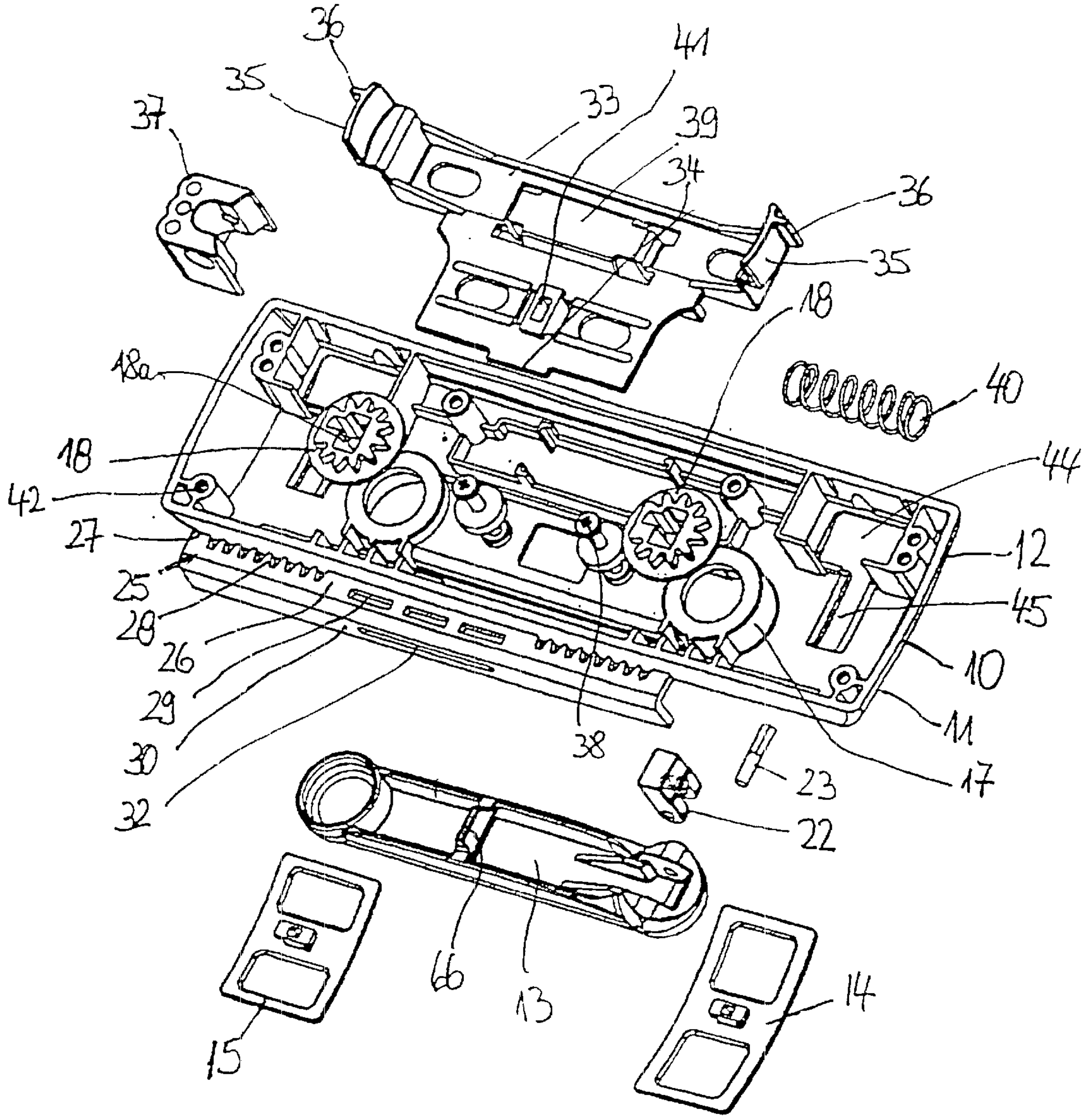
FIG. 3 the subject of FIG. 2 in an exploded view.

FIGS. 2 and 3 illustrate in detail the functional structure of the locking apparatus, that is, of the door plate as carrier of the actuating functions. It should be noted that with regard to desired installation of the door plate 10 for a left-fixed or right-fixed door, which requires the door plate to be rotated 180°, the door plate is designed and equipped symmetrically so that to re-configure the door it is only necessary to change the handle inserted in the door plate, as will be described in detail.

Figure 4B:
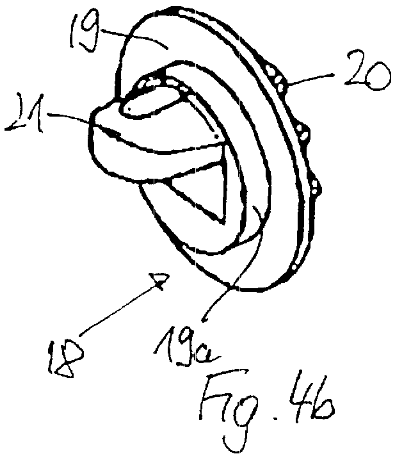
FIGS. 4*a, b* different individual views of the pinion.
Figure 4A:
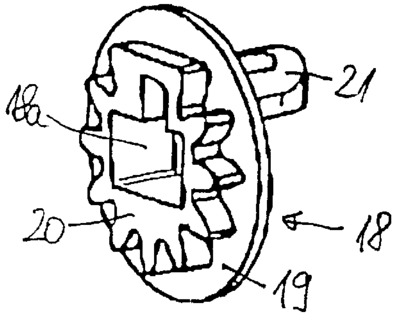
Figure 5:
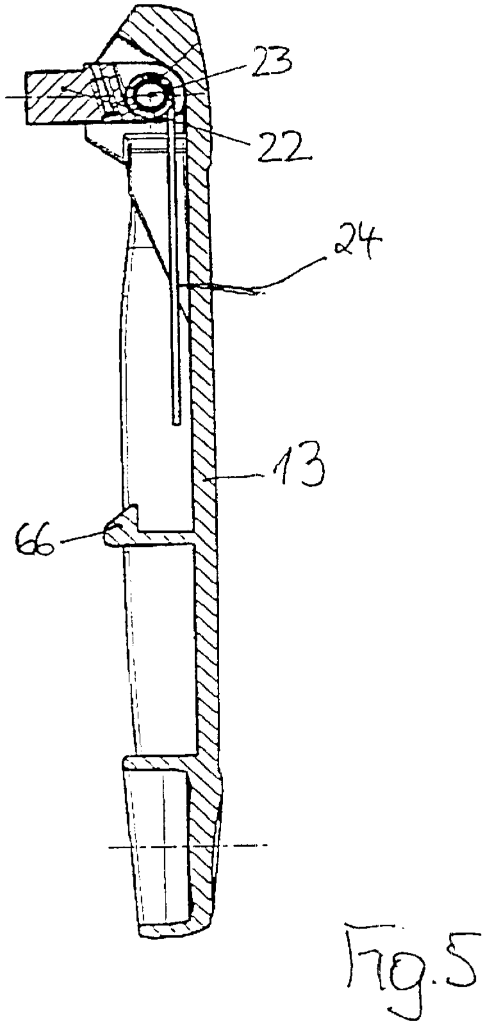
FIG. 5 a side view of the handle.

Projecting into the interior in the region of each of the two ends of the handle 13 on the door leaf and here at its first door plate area are hat-shaped bearing rings 17, each of which bears a pinion 18. The basic body of the pinion 18 comprises a disk 19 that with a bearing projection 19*a* facing the handle 13 engages the hat-shaped bearing ring 17 and is borne here (see FIG. 4*b*). Placed on the side of the disk 19 facing the door leaf 60 are pinion teeth 20, whereby the diameter of the pinion teeth 20 is smaller than the diameter of the disk 19. On the bearing side the pinion 18 also has a U-shaped closed projection 21 that extends through the hat-shaped bearing ring 17 into the depression that receives the handle 13 so that the handle 13 can be affixed directly to the pinion 18. A pivot pin 22 forming the axis of rotation for the handle 13 is inserted in a form fit into the associated opening 18*a* of the pinion 18 and together with corresponding bearing projections of the handle 13 is affixed to the projection 21 of the pinion 18 by corresponding receipt in pivot pin 22 and handle 13 so that the handle 13 can pivot around the axis 23 perpendicular to the plane of the door plate, but also so that rotating the handle 13 parallel to the plane of the door plate 10 results in a rotational movement of the pinion 18. As can be seen in FIG. 5, the handle 13 is under the effect of a pre-tensioned spring 24 that urges it to the position pulled out from the door plate 10.

Provided for transferring the rotational movement of the pinion 18 into a longitudinal movement of the bolt mechanism 63 is a toothed rod 25 that is embodied with two legs. Arranged on the leading edge 27 of the leg 26 arranged parallel to the door plate plane are the teeth that cooperate with the pinion 18, while the guide leg 30 of the toothed rod 25 is guided in the interior on guide noses 31 located on the housing surface of the door plate 10. Embodied on the leg 26 are connection openings 29 in which projections embodied on the bolt mechanism 63 engage in a manner not shown when the door is closed so that displacing the toothed rod 25 is translated to actuating the bolt mechanism 63. Since two pinions 18 are borne on the bearing rings 17 due to the symmetrical design of the door plate, the toothed rod 25 extends across both pinions 18, whereby only one pinion acts as drive pinion under the effect of the handle 13, while the other pinion rotates with no effect when the toothed rod 25 is displaced.

Since the leg 26 of the toothed rod 25 is adjacent to the protruding disk 19 opposite the pinion teeth 20, both pinions are maintained in their bearing in their associated bearing ring 17 by the toothed rod 25; the toothed rod 25 has in the guide leg 30 a longitudinal slot 32 in which a nose 34 arranged on a bolt plate 33 (to be described in the following) engages so that the toothed rod 25 is guided and fixed via the bolt plate 33 mounted on the door plate 10 and thus also holds the pinions 18 without additional means of attachment, whereby the pinions 18 themselves hold the handle 13 as described.

The aforesaid bolt plate 33 is held in the interior on the door plate 10 by means of screws 38 such that the bolt plate 33 is vertically displaceable. In its middle region the bolt plate 33 has a bolt projection 41 that engages and releases a hook 66 formed on the handle 13 (FIG. 5) so that depending on the position of the bolt plate 32 in the door plate 10 the handle 13 is held in its position pulled out of the door plate 10 under the effect of the spring 24 or is held in its inserted position.

The bolt plate 33 extends laterally from its attachment at the screws 38 across the second door plate area 12 and cooperates via projecting actuating surfaces 35 formed on it with the closing cam of a lock cylinder (not shown), which, as described for FIG. 1, is inserted in the lower opening 44 in the door plate 10 and is held to the rear by a mount 37. As can be seen with the view in FIG. 1, the lower covering cap 16 covers the lock cylinder (not shown) with the mount 37. The actuating surfaces 35 are provided with an end stop 36 for the closing cam (not shown) of the cylinder lock. Located between the two symmetrically arranged actuating surfaces 35 is a housing 39 for a spring 40 disposed thereunder that is supported on the projections of the door plate 10 and, on the interior, on the housing 39 of the bolt plate 33 such that the effect of the spring acts in both actuating directions of the bolt plate 33.

As can be seen in particular in FIG. 3, connected to the openings 44 for inserting the lock is a guide slot 45 in which the sliding cap 15 covering the inserted lock is guided or into which the blind cap 14 can be inserted.

The attachment of the door plate 10 to the door leaf occurs via attaching screws that pass through the door leaf and screw into the screw domes 42 of the door plate 10, whereby the covering caps 16 placed on the back side and screwed in with screw domes 43 also ensure that the door plate 10 is attached while clamping the door leaf.

If the lock behind the sliding cap 15 is actuated, the bolt plate is displaced against the effect of the spring 40 via the movement of the closing cam (not shown) along the associated actuating surface 35 of the bolt plate 33, so that the bolt projection 41 releases the hook 66 of the handle 13 and the handle 13 opens out of the plane of the door plate 10 under the effect of the spring 24. Then the handle 13 can be grasped and pivoted in a plane parallel to the plane of the door plate 10.

This pivoting is translated into a rotational movement of the pinion 18, which displaces the toothed rod 25, which itself causes the bolt mechanism 63 connected to it to move when it is displaced.

The special nature of the locking apparatus, in addition to the positioning of the first and second door plate areas, is that the movable parts, such as handle, pivot pin, pinion, and toothed rod, hold themselves or are fixed by the nose 14 of the bolt plate 33 so that only the bolt plate 33 has to be screwed to the door plate 10. If the door plate 10 configured in the illustration in FIG. 1 on a right-fixed door is to be converted to a left-fixed door, either by rotating the door leaf or by re-configuring the door plate, it is merely necessary to remove the handle 13 from the door plate 10 and, once it has been rotated 180°, re-install it, whereby no additional adaptations are necessary due to the symmetrical construction of all of the functioning parts in the interior of the door plate 10, such as pinions, toothed rod, etc. The handle can be re-configured from the front side of the door plate in that with the handle in the pulled out position the axis 23 is removed from the projection 21 of the pinion 18, whereby the pivot pin 22 and the handle 13 come free of the pinion 18. Once the door plate 10 has been rotated, it is only necessary for the pivot pin to be inserted into the opposing pinion 18 and together with the handle 13 to be added by inserting the axis 23 into the projection 21 of the other pinion 18. In the same manner, it is possible to re-configure the lock in a simple manner in that the blind cap 14 and the sliding cap 15 are removed from the guide slots 45 of the openings 44. Once the two covering caps 16 have been unscrewed, the mount 37 can be removed from the door plate 10 and replaced in the area of the other opening 44 in a position of the door plate 10 that has rotated 180° so that the lock in the form of a cylinder lock (not shown) can be inserted and fixed. Once the covering caps 16 have been screwed on and the associated blind cap 14 and sliding cap 15 have been installed, the locking apparatus is ready for use again.

The locking apparatus described in the foregoing is suitable for installation in cabinets or housings having different heights because a total of three connection openings 29 for coupling to the bolt mechanism 63 are formed in the toothed rod 25. If correspondingly short locking rods are used for the bolt mechanism 63 in a smaller cabinet or housing, these can be connected to the center connection opening 29. In the case of a correspondingly taller cabinet or housing, shorter locking rods can be connected for the bolt mechanism 63 in each of the outer connection openings 29 of the toothed rod 25 so that it is possible to use short locking rods for the bolt mechanism 63 even in cabinets of greater height.

The features of the subject of this document disclosed in the foregoing specification, patent claims, abstract, and drawings can be essential individually and in any desired combinations for realizing the invention in its various embodiments.

The specification incorporates by reference the disclosure of German priority document 100 13 487.4 filed Mar. 20, 2000 and International priority document PCT/DE0/1/01048 of Mar. 19, 2001.

What is claimed is:

1. A locking apparatus for doors of housings or cabinets having in particular narrow frame profiles, said locking apparatus comprising:

a bolt mechanism that is longitudinally guided in a frame profile;

a door plate for being fixed to an exterior of a door leaf of a housing or cabinet, wherein a handle is disposed in said door plate and can be pulled out of a plane of said door plate, wherein in an inserted position in said door plate said handle can be locked and unlocked by a lock disposed in said door plate, wherein said door plate is provided with at least one member, for receiving said lock, extending through said door leaf in at least one opening thereof disposed beyond said frame profile, and wherein said door plate has a first door plate area for receiving said handle and a second door plate area located beyond said frame profile in front of said at least one opening of said door leaf;

at least one pinion coupled to said handle and disposed in an intermediate space located between said door leaf and said door plate, wherein said first door plate area, along with said at least one pinion, are disposed in front of said frame profile and said bolt mechanism located therein;

a transfer member that is driven by said at least one pinion and can be coupled to said bolt mechanism for longitudinally displacing said bolt mechanism, wherein said transfer member is in the form of a toothed rod guided in a gap between said at least one pinion and an exterior wall of said first door plate area, wherein said toothed rod is disposed parallel to said door leaf and is provided on an edge thereof with teeth for engaging teeth of said at least one pinion, wherein a surface of said toothed rod that faces said frame profile is provided with connection means for said bolt mechanism;

a mounting means in said second door plate area for said lock for said handle; and a bolt plate that spans said first and second door plate areas and is displaceable under the effect of a spring, wherein actuation of said lock effects release of said handle via said bolt plate.

2. A locking apparatus according to claim 1, wherein said toothed rod has an angular shape, including a first leg actuated by said at least one pinion and a second guide leg disposed at right angles to said first leg, wherein said guide leg is provided with a cut out for engaging a nose located on said bolt plate, which is mounted on said door plate.

3. A locking apparatus according to claim 1, wherein said door plate is provided with a hat-shaped bearing ring, wherein said at least one pinion is in the form of a flat disk that is rotatably mounted in said bearing ring, wherein said teeth of said at least one pinion are axially raised on one side of said flat disk, and wherein a diameter of said disk is greater than a diameter of said teeth thereof.

4. A locking apparatus according to claim 1, wherein on a side opposite said teeth thereof, said at least one pinion is provided with a projection that extends into a recess of said door plate that receives said handle, wherein said handle is provided with a pivot pin that positively engages said projection, and wherein said handle is mounted so as to be pivotable at right angles to the plane of said door plate.

5. A locking apparatus according to claim 4, wherein said handle and said pivot pin are detachably mounted on said projection of said at least one pinion when said handle is in a position where the handle is pulled out from said door plate.

6. A locking apparatus according to claim 1, wherein two pinions are mounted on associated bearing rings in a symmetrical arrangement on an interior side of said door plate, and wherein said teeth of said toothed rod engage said two pinions.

7. A locking apparatus according to claim 1, wherein upper and lower edge areas of said second door plate area are each provided with an opening for the selective insertion of said lock that extends through an associated one of said at least one openings of said door leaf, and wherein a blind cap that is insertable in said door plate is provided for covering that opening that is not used for said lock.

8. A locking apparatus according to claim 7, wherein a sliding cap is provided that is displaceable in said door plate transverse to a vertical axis thereof, and wherein said sliding cap is provided for covering that opening of said second door plate area that receives said lock.

9. A locking apparatus according to claim 8, wherein said blind cap and said sliding cap are convex relative to said door plate and are exchangeably insertable into a guide that adjoins said opening of said second door plate area.

* * * * *